United States Patent Office 3,451,252
Patented June 24, 1969

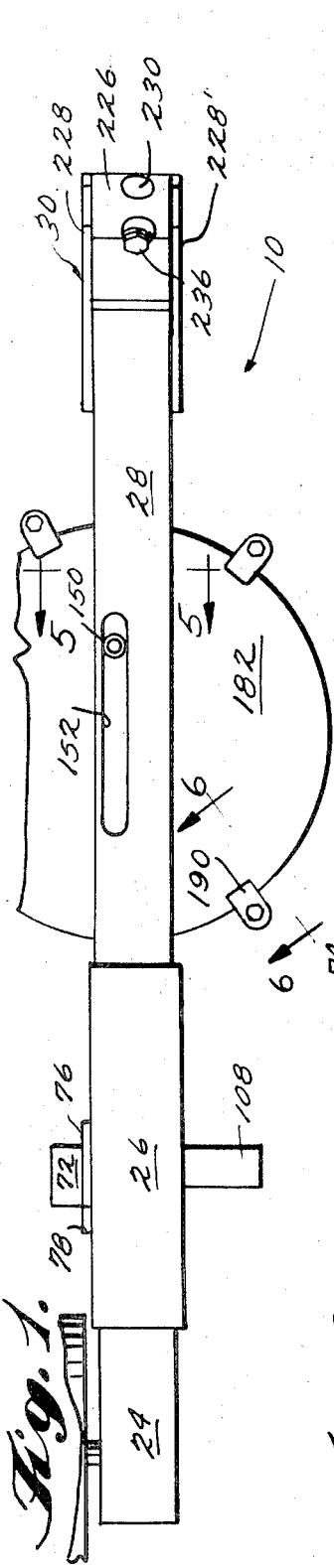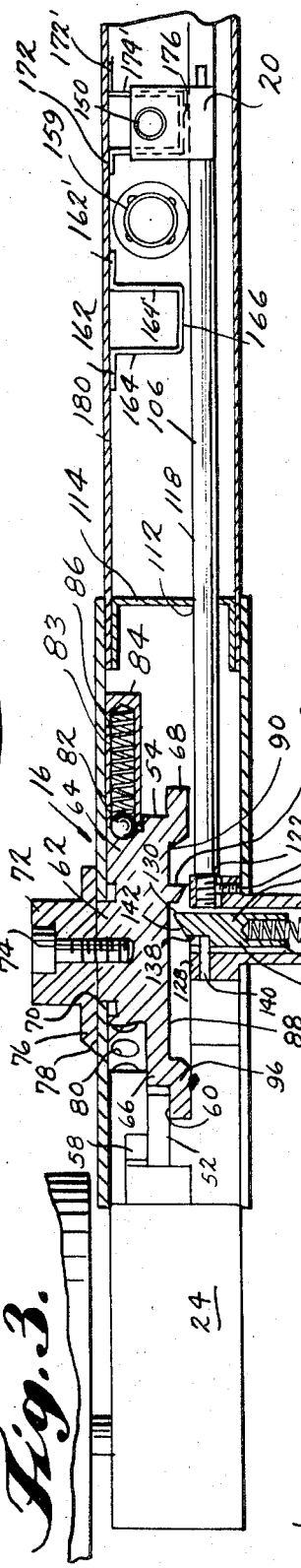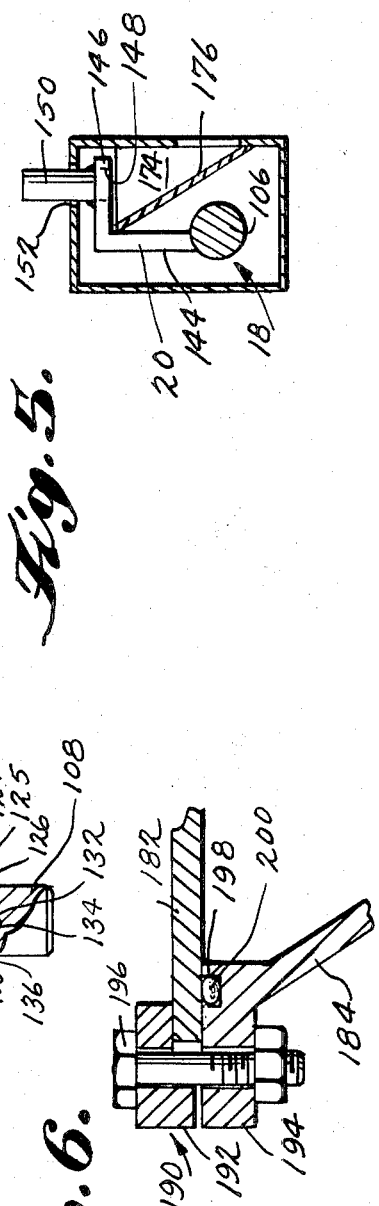

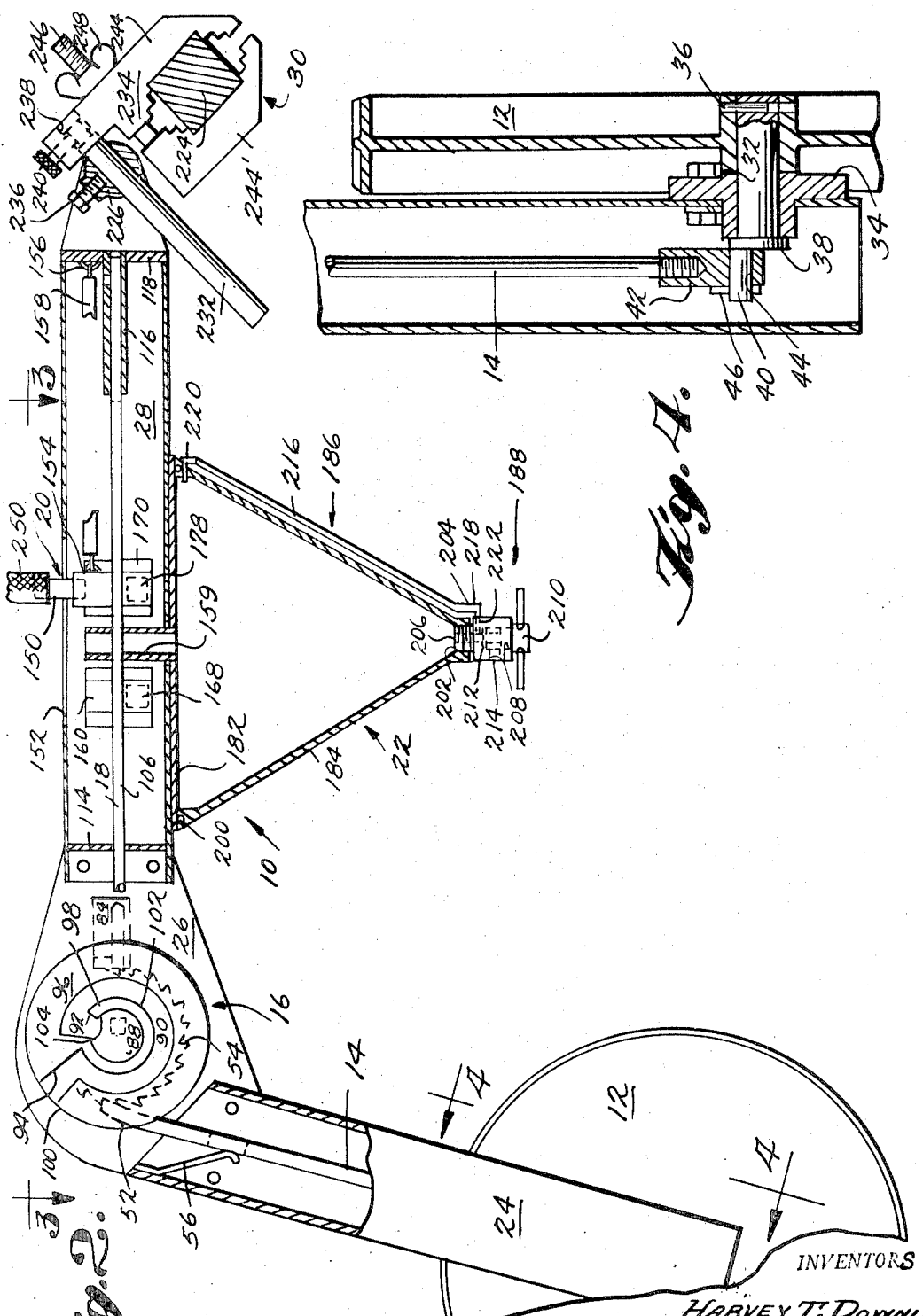

3,451,252
CALIBRATOR FOR AGRICULTURAL SPRAYERS
Donelson B. Horton, Madison, and Harvey T. Downing, Huntsville, Ala., assignors to John Blue Company, a division of Subscription Television, Inc., New York, N.Y., a corporation of Delaware
Filed Nov. 1, 1967, Ser. No. 679,728
Int. Cl. G01c 25/00
U.S. Cl. 73—1         15 Claims

ABSTRACT OF THE DISCLOSURE

The calibrator comprises a calibrated receiver, an intake coupling adapted to be connected to a supply line of the equipment being calibrated and a control means responsive to the movement of the calibrator for controlling the period of discharge from the intake coupling into the receiver whereby the discharge from the supply line for a specific distance can be measured. The control means comprises a ground engaging wheel, a cam member which is driven by the wheel and a cocking lever rod having the intake coupling mounted thereon. The cam is provided with first, second and third cam surfaces which are engaged by a cleat on the spring-loaded cocking lever with the position of the cocking lever and consequently, the intake coupling mounted on the cocking lever being determined by the cam face engaged by the cleat.

Brief description of the invention

The present invention relates to a calibrator and more specifically to a calibrator for simplifying and expediting the calibration of agricultural chemical sprayer equipment.

Sprayer application equipment today generally includes a tank, a pump, a pressure regulator and a boom with orifices mounted thereon at desired row widths. The rate of output is independent of the ground speed and is only a function of the pressure at the orifice and the orifice size. It is therefore necessary to relate the ground speed and the output rate in order to obtain an expression of the output rate per unit area such as gallons per acre.

All methods currently used to calibrate spray equipment are basically the same. The procedure involves: choosing a tentative orifice size and the regulator pressure by feeding data on desired output, row spacing, and intended application speed into special slide rules or tables; bringing the sprayer up to the intended application speed; catching in a container the output from one or more orifices for a fixed distance of travel; measuring the output; and using the information with regard to the measured output and the desired row spacing in an equation or a table to determine the actual output in gallons per acre.

Because of numerous conditional factors, the actual output will generally vary from the desired output and this laborious calibration procedure must be repeated. Output variations which are caused by such factors as worn orifices, an inaccurate pressure gauge, or a deviation of application speed from the desired application speed can be compensated for in subsequent calibration reruns provided the output is always precisely measured and the distance travel during the calibration run is exact. If these latter parameters are not rigidly controlled, an accurate prediction of the output on an acreage basis is impossible.

Obviously, the usual calibration procedure is tedious and wide open to errors. The container or vessel used to measure the orifice output must be of proper size and must be calibrated for accuracy. If the container or vessel used to measure the output is not accurately calibrated, the possibility of error in calculating the output on an acreage basis is tremendous. Another place where errors can easily occur is in the measuring of the distance between the stakes which are used to mark the points where the boom valves of the sprayer are to be open and closed. Additional error is introduced into the procedure by the fact that the operator must judge when the booms have passed by the stakes so that he may open and close the valves. It is obviously difficult, if not impossible, to accurately open and close the valves exactly at the point where the stakes are located. Finally, errors can easily be made in using the equations and tables to arrive at the end result.

The present invention solves the problems of the prior art by providing a calibrator comprising an accurately calibrated conical receiver, an intake coupling mounted on a cocking lever and adapted to be connected to a supply hose of the apparatus to be calibrated, a cam which positions the cocking lever and, consequently, the intake coupling with regard to a receiver tube on a conical receiver, and a ground engaging wheel. A drive rod is eccentrically mounted on the axle of the ground engaging wheel with a free end of the rod engaging teeth on the cam member and causing the cam to revolve a certain increment for each revolution of the ground engaging wheel. The cam is provided with first, second and third concentric cam surfaces which are engaged by and which position the cocking lever in three separate positions as the cam member is indexed around during a calibration run. In the initial position, at the start of a run, the cleat on the cocking lever engages the first outer cam surface and the intake coupling mounted on the cocking lever is centered over a first discharge manifold on the calibrator which diverts the fluid from the supply line onto the ground. After traveling 75 feet, the cam surface has been indexed around by the drive rod to a position where the cleat on the cocking lever engages the second intermediate cam surface of the cam member. In this position, the intake coupling is centered over the receiver tube of the conical receiver and for the next 75 feet, fluid from the supply line is discharged into the receiver. At the end of the second 75 feet, the cam has been indexed around again to a point where the cleat on the cocking lever gauges the third inner cam surface of the cam member and the intake coupling is now centered over a second discharge manifold which deflects the fluid from the supply line onto the ground once more. The sprayer equipment may now be turned off.

All the operator must do after the run is read the sight gauge on the receiver and apply this reading to a table of figures (with columns for different row spacing) attached to the side of the calibrator. The table is set up to give the output in gallons per acre for different readings on the sight gauge.

While it is still possible that a calibration run may have to be repeated due to the unpredictable conditions, such as orifice wear and gauge error, the calibrator will insure that the amount of spray caught can be accurately measured and that the fixed distance of travel is exact and reproducible. Further, it is obvious that knowledge of actual speed is not a factor in using the calibrator because as the speed varies so does the length of time during which the calibrated receiver receives the liquid. Thus, all the operator has to do is drive at his preferred throttle setting and in his preferred gear when calibrating the equipment.

With the present invention, the need for measuring and staking off a specific distance as is required in the conventional methods of calibrating is no longer required. It is also no longer necessary to attempt to open and close the boom valve as the boom of the sprayer passes the stakes. Further, the use of slide rules, tables and/or calculating means to convert raw data into meaningful figures of gallons per acre has been eliminated.

The calibrator solves the above problems in the prior art and provides a means of accelerating and improving the accuracy of the whole calibration procedure by incorporating into a compact unit a calibrated receiver, a mechanism for accurately controlling the output catch distance within which fluid is discharged into the receiver and a simple attached table for converting readings from the receiver into gallons per acre.

Other advantages of the present invention over the prior art will become more apparent from the following disclosure when taken in combination with the accompanying drawings in which:

FIGURE 1 is a plan view of the calibrator of the present invention;

FIGURE 2 is a side elevational view partially in section of the calibrator;

FIGURE 3 is a cross-sectional view taken substantially along line 3—3 of FIGURE 2;

FIGURE 4 is a cross-sectional view taken substantially along line 4—4 of FIGURE 2;

FIGURE 5 is a cross-sectional view taken substantially along line 5—5 of FIGURE 1; and FIGURE 6 is a cross-sectional view taken substantially along line 6—6 of FIGURE 1.

*Detailed description of the invention*

The calibrator of the present invention generally indicated by reference character 10 comprises a ground-engaging wheel 12, a drive rod 14, a cam member 16, a cocking lever 18, an intake coupling 20, a receiver 22, frame and shielding members 24, 26, 28 and universal clamp 30.

As shown in FIGURES 2 and 4, ground-engaging wheel 12 is mounted on an axle 32 which, in turn, is received within a sleeve or bearing 34 that is bolted to frame member 24. The wheel is secured by a pin 36 to axle 32 with the pin preventing both rotational and axial movement of wheel 12 with respect to axle 32. The hub of wheel 12 abuts one end of sleeve 34 while the axle 32, which is rotatably received within the sleeve, has an annular flange 38 that engages the other end of sleeve 34 thereby securing axle 32 and wheel 12 to the sleeve.

One end of axle 32 is provided with an integral eccentric extension 40 and a coupling element 42 that interconnects extension 40 with reciprocating drive rod 14. Cylindrical coupling element 42 has a transverse aperture 44 therethrough and is rotatably mounted on extension 40 which passes through aperture 44. Coupling element 42 is retained on extension 40 by cotter pin 46 that passes through the extension thereby preventing axial movement of the cylindrical element with respect to the eccentric extension 40. A washer is also provided on extension 40 intermediate cotter pin 46 and coupling element 42 to ensure that cotter pin 46 and coupling element 42, which rotates on the extension will not interfere with each other.

The cylindrical coupling element 42 is provided with an axially-extending threaded hole in its outer end within which is mounted the lower end of reciprocating drive rod 14. Drive rod 14 has a free upper end 52 which extends at an angle to the longitudinal axis of the rod and engages teeth 54 on cam member 16. Due to the reciprocating motion of drive rod 14 caused by the movement of eccentric extension 40 as wheel 12 rolls over the ground, cam member 16 is rotated by drive rod 14 when the calibrator is in motion thereby positioning cocking lever 18 and, consequently, intake coupling 20.

The drive rod 14 is urged against the teeth 54 of cam member 16 by means of a leaf spring 56 which is welded at one end to the upper portion of frame member 24 and at the other end bears against reciprocating drive rod 14. Spring 56 also cooperates with element 58, which is welded to the side of drive rod 14, to ensure that the upper end portion 52 of the drive rod is properly aligned with the teeth 54 of the cam member 16. As viewed from above, in FIGURE 3, element 58 abuts spring 56 to prevent counter-clockwise rotation of the drive rod in coupling 42 while annular surface 60 of cam member 16 cooperates with the upper end portion 52 of drive rod 14 to prevent clockwise rotation of the drive rod in coupling 42 thereby maintaining upper end portion 52 in proper alignment with teeth 54. Of course, it is contemplated that drive rod 14 can be locked against rotation by other means such as a jamb nut or cotter pin if desired.

As shown in FIGURE 3, cam member 16 comprises four cylindrical portions of progressively greater diameter 62, 64, 66 and 68, respectively. The cam member 16 rotates about a substantially horizontal axis with protruding portion 62 of the cam member extending through and rotatably retained in aperture 70 of frame 26 by knob 72. Knob 72 is bolted to portion 62 by means of bolt 74 with the flange 76 of the knob abutting the outer surface of frame member 26 to thereby rotatably retain the protruding portion 62 of the cam within aperture 70 of the frame. A key, cotter pin or similar locking means (not shown) is provided in portion 62 to prevent bolt 74 from loosening due to vibrations when the cam member 16 is being set for a calibration run. Knob 74 is also provided with an indicator or pointer 78 which is aligned with a mark on the outer surface of frame member 26 at the beginning of the calibration run to properly position cam member 16 relative to cocking lever 18.

The surface of portion 64 is provided with circumferentially spaced depressions 80, while the surface of portion 66 is provided with teeth 54, which, as discussed above, are engaged by upper end portion 52 of drive rod 14. A spring-loaded ball 82 cooperates with the depressions 80 to prevent the cam member 16 from rotating during the return stroke of drive rod 14 when the drive rod is out of contact with the teeth 54. Ball 82 is carried within a cylindrical aperture 83 of housing 84 which is welded or secured in some other conventional manner to the inner surface of frame member 26. A coil spring 86 within aperture 83 of housing 84 urges the ball 82 into the depressions 80 of cam member 16 with the surface of portion 64 maintaining ball 82 in aperture 83.

The circular end face of portion 68 of cam member 16 has a central cylindrically-shaped depression 88, a concentric semi-annular slot 90 and two radial slots 92 and 94. Radial slot 92 interconnects central depression 88 with one end of semi-annular slot 90, while radial slot 94 interconnects the other end of semi-annular slot 90 with the outer surface of portion 68. The central depression 88, along with slots 90, 92 and 94 define outer and inner cam lands 96, 98 respectively. The outer surface of the outer land 96 forms a first or outer cam face 100, the outer surface of the inner land 98 forms a second or intermediate cam face 102 and the inner surface of inner land 98 forms a third or central cam surface 104, all of which cooperate with cocking lever 18 to position the intake coupling 20 relative to receiver 22. In the preferred form of the invention, the counter-clockwise angular distance from the starting position on the outer cam face 100 to radial groove 94 is the same as the angular distance from radial groove 94 to radial groove 92 for reasons as will be explained hereinafter.

Spring-loaded cocking lever 18 cooperates with cam member 16 to position the intake coupling 20 in three separate positions during each calibration run as will be explained hereinafter. The cocking lever 18 comprises a shaft 106 slidably mounted within frame members 26, 28 and a handle 108 provided with a spring-loaded follower or cleat 110 having a square transverse cross-section. The shaft 106 extends horizontally through an aperture 112 in end plate 114 of frame member 28 with one end of the shaft being received in sleeve 116 which is welded or secured in some other conventional manner to end plate 118 or frame member 28. The aperture 112 is aligned with the center line of sleeve 116 with both the sleeve and aperture being offset with respect to the longitudinal center line of frame 28 so that the cocking lever is aligned with cam member 16.

As best shown in FIGURE 3, handle 108 is mounted on the free end of shaft 106 and extends at substantially right angles to the shaft. To keep the handle and, consequently, the cleat or follower 110 in proper alignment with cam member 16, the end of shaft 106 is threaded into aperture 122 of handle 108 and relative rotation between the members is prevented by screw 124 of the handle which is received in the longitudinally extending keyway 125 of the shaft.

The handle 108 is substantially cylindrical in shape having a roughened outer surface suitable for gripping, and an axially extending central aperture 126 therein which extends partway through the handle from the inner surface 128 of the handle. Cleat 110 is slidably mounted within aperture 126 and normally extends beyond the inner surface 128 of the handle so that surface 130 of the cleat engages the cam faces 100, 102 and 104 of cam member 16 during a calibration run. The cleat is spring-loaded by means of a coil spring 132, which extends axially within the aperture with one end of the spring being retained in a small recess 134 in the end of the aperture and the other end retained in a recess 136 in the cleat. The cleat is provided with a groove 138 in one side within which pin 140 is slidably received. Pin 140 is frictionally retained in an aperture in handle 108 and prevents the cleat 110 from coming out of the handle, while permitting the cleat to be depressed within the aperture 126 as the cleat passes over the cam lands 96, 98 during the cocking of the lever. In addition, the cleat 110 has a diagonal end face 142 which cooperates with the beveled surfaces of the cam lands 96, 98 to facilitate movement of the cleat as it slides over the lands of cam member 16 when the calibrator is being cocked.

Intake coupling 20 is mounted on the cocking lever intermediate the end portions of the lever. The intake coupling comprises a vertically extending plate 144 welded or mounted on some other conventional manner on the upper surface of the cocking lever 18, horizontally extending plate 146 having an aperture 148 therein and a vertically extending tube 150 extending through aperture 148 and welded to the horizontal plate 146. Tube 150 extends through and is slidably retained in a longitudinal slot 152 located in the upper surface of frame member 28. The slot 152 not only serves as a guide for the intake coupling 20, but also serves to prevent the shaft 106 from rotating thereby keeping handle 108 properly aligned with cam member 16.

The vertical plate 144 has a loop 154 and end plate 118 has a similar loop 156 thereon, both of which are centered over the cocking lever 18. Coil spring 158 extends between loops 154 and 156 whereby the intake coupling 20 and, therefore, the cocking lever rod 18 is spring loaded.

As shown in FIGURES 2, 3 and 5, frame member 28 is provided with two discharge manifolds 160, 170 which are located within frame member 28 adjacent the ends of slot 152 on either side of a receiver tube 159. The manifolds 160, 170 comprise flanges 162, 162′ and 172, 172′, which are welded or secured in some other conventional manner to a sidewall 180 of frame member 28 intermediate walls 164, 164′ and 174, 174′ and inclined walls 166, 176 which abut and are welded to sidewall 180 at their lower ends and diverge inwardly from the sidewall 180. The openings at the top of the manifolds, which are defined by sidewall 180 and by walls 164, 164′, 166 and 174, 174′, 176, respectively, extend inwardly from the sidewall past slot 152 whereby the intake coupling 20 is centered over the openings when in its initial and final positions during a run. Apertures 168, 178 are provided in sidewall 180 of frame member 28 adjacent and in communication with the lower portions of manifolds 160, 170 so that fluid from the intake coupling 20 passes through the manifolds and out onto the ground.

Vertically extending receiver tube 159 which, like manifolds 160 and 170 is aligned with slot 152, passes through apertures in the bottom of frame member 28 and the cover plate 182 of receiver 22 whereby when the intake coupling 20 is in its intermediate position during a calibrating run, fluid from the coupling passes through receiver tube 159 and into the receiver 22. While the tube is shown welded to the bottom of frame member 28, it is contemplated that the tube can be rigidly secured to the frame in any conventional manner.

As shown in FIGURES 1, 2 and 6, the receiver comprises a circular cover plate 182, which is welded or otherwise suitably secured to frame member 28, and an inverted hollow conical container 184 which is provided with a sight gauge 186 and a discharge valve 188. The hollow conical reservoir is secured by means of clamping elements 190 to the cover plate 182. The clamping elements 190 engage the upper surface of cover plate 182 and are provided with vertically extending flanges 192 which cooperate with the upper surfaces of the outwardly extending lugs 194 on the conical container 184 to prevent the clamping elements from pivoting when the bolts 196 interconnecting the clamping elements and lugs are tightened. To insure that the joint between the cover plate 182 and the conical container 184 is properly sealed, an annular groove 198 is provided in the base of the conical reservoir wih an O-ring 200 in the groove engaging and compressed between the cover plate 182 and the bottom of the groove 198.

Discharge valve 188 is threaded into an aperture 202 located at the apex of the conical container 184. The valve housing 204 has a longitudinally extending aperture therethrough with a reduced diameter intake portion 206 and an enlarged diameter valve chamber portion 208. The reduced diameter inlet portion communicates with the interior of the container 184, while the enlarged portion has a plug 210 threadedly mounted therein which cooperates with sealing ring 212 in the aperture to regulate the flow of fluid to discharge port 214.

The sight gauge 186 comprises a transparent calibrated plastic or glass tube 216 which extends between and is mounted on tubular fittings 218 and 220. Fitting 218 is mounted in aperture 222 of valve housing 204 and is in communication with intake portion 206, while fitting 220 extends through and is mounted in the conical container adjacent the upper end thereof. Wtih the sight gauge and tables (not shown) on the reservoir, one can quickly and accurately ascertain the amount of fluid in the container and the output of the machine being calibrated.

Universal clamp 30 is provided to couple the calibrator to a cross bar 224 which is carried by either the tractor pulling the apparatus to be calibrated or the apparatus being calibrated. The universal clamp comprises a first cylindrical member 226 which is mounted between brackets 228, 228′ that are, in turn, welded or secured in some other suitable manner to frame member 28. Reduced cylindrical end portions of member 226 are rotatably mounted within aligned apertures in brackets 228, 228′ with member 226 rotating about a horizontal axis. Member 226 is provided with a centrally located transverse aperture 230 within which is mounted rod 232. Rod 232, which supports clamp 234, is retained within the aperture 232 by means of bolt 236 which extends at right angles to the rod through a threaded aperture in member 226 and engages the rod midway through aperture 230.

Clamp 234 is provided with an aperture 238 within which rod 232 is slidably received. A screw 240, carried by the clamp at right angles to aperture 238, can be threaded into or out of the aperture so as to extend into an annular groove 242 provided adjacent the end of rod 232. In this manner, clamp 234 is rotatably mounted on rod 232 with the clamp rotating about an axis which is perpendicular to the axis of member 226. The clamp 234 has two substantially channel-shaped members 244, 244' which face each other and are joined together by means of stud 246 and wing nut 248. The facing surfaces of the two channel-shaped members are stepped having a series of transverse notches which enable the clamp to be mounted on cross arms 224 of various sizes. In addition, the outer ends of the members are beveled to facilitate clearance between the clamp and the apparatus or the tractor.

*In operation*

After the calibrator has been clamped to cross bar 224, a supply host 250 of the apparatus to be calibrated is mounted on tube 150 of intake coupling 20. The cam member 16 is properly set by means of knob 72 so that the cam member is in the proper angular position (as shown in FIGURE 2) for the beginning of the calibration run. The cocking lever 18 is then pulled to the left, as viewed in FIGURES 2 and 3, from the position shown, which is the position of the cocking lever and the intake coupling at the end of the calibration run, to the position which the cocking lever takes at the beginning of a calibration run wherein cleat 110 engages cam face 100 of cam member 16. In this initial position, intake coupling 20 is centered over discharge manifold 160, rather than discharge manifold 170 as shown in FIGURE 3.

The calibration run is now started with the fluid from supply hose 250 flowing through intake coupling 20 and manifold 160 out onto the ground. As the apparatus progresses across the ground, wheel 12 through eccentrically mounted drive rod 14 indexes cam member 16 in a clockwise direction with movement of the cam member between strokes of drive rod 14 being arrested by means of spring-loaded ball 82, which cooperates with depressions 80 on cam member 16. After a pre-selected distance has been traversed, which gives the tractor time to accelerate to the normal operating speed, 75 feet in the preferred form of the invention, cleat or follower 110 of cocking lever 18 is aligned with slot 94 thereby allowing the cocking lever to be pulled to the right by means of coil spring 158 until cleat 110 engages cam face 102 of cam member 16. Since the radial distance between cam faces 100 and 102 equals the distance between the center of discharge manifold 160 and receiver tube 159, the intake coupling 20 is now centered over receiver tube 159 and fluid from supply hose 250 now flows into receiver 22. After a pre-determined distance has been traversed, with the intake coupling 20 centered over receiver tube 159, which in the preferred form of the invention is 75 feet, cleat 110 is aligned with radial slot 92 and spring 158 again pulls cocking lever 18 and, consequently, intake coupling 20, to the right placing intake coupling 20 in its final position of the calibration run. Since the distance between cam face 102 adjacent slot 92 and cam face 104, equals the distance between receiver tube 159 and discharge manifold 170, the intake coupling 20, in its final position, is centered over discharge manifold 170 so that fluid from supply line 250 flows through coupling 20 and discharge manifold 170 onto the ground.

After the intake coupling has assumed its final position, the operator of the tractor brings the machine to a halt and can then, by means of sight gauge 186, ascertain the output of supply line 250 for the distance covered when the intake coupling 20 was centered over receiver tube 159. The operator then applies this reading to a table of figures (with columns for different row spacings) attached to the side of the calibrator to determine the output in gallons per acre. After this has been done, receiver 22 can be emptied through discharge valve 188 and if the output is unsatisfactory, another calibration run can be performed after the desired adjustments have been made on the apparatus to correct the output.

Although, in the preferred form of the invention, the distance traversed by the calibrator with the intake coupling 20 in its initial position during acceleration of the tractor is the same as the distance traversed with the intake coupling 20 in its intermediate position during discharge into receiver 22, these ditsances can be made to differ, if desired, by changing the relative angular distances that cleat 110 engages cam faces 100 and 102. In addition, by altering the angular distances that cleat 110 engages cam faces 100 and 102, by utilizing a wheel 12 of greater or smaller diameter or by using a cam member 16 with a different number of teeth 54, the distance traversed by the calibrator with the intake coupling 20 in its initial and intermediate positions can be varied as necessitated. Furthermore, while the preferred form of the invention has been shown and described, it is to be understood that all suitable modifications and equivalents may be resorted to which fall within the scope of the invention.

What is claimed is:

1. A calibrator for calibrating chemical sprayer apparatus and the like comprising:
   an intake means adapted to be connected to a fluid supply line of the equipment being calibrated;
   a calibrated receiver for measuring the fluid output of said supply line;
   control means responsive to the distance traversed by said calibrator for regulating the period of discharge from said intake means into said receiver whereby the fluid discharge from said supply line for a specific distance can be measured.

2. In the calibrator of claim 1:
   said control means having means for delaying the initiation of the period of discharge from the intake means into the receiver until the calibrator has traversed a specific distance to enable the apparatus to attain operating speed prior to the period of discharge from the intake means into said receiver.

3. In the calibrator of claim 2:
   said control means comprising a cam means for delaying the initiation of the period discharge from the intake means into the receiver and regulating said period of discharge from said intake means into said receiver, said cam means being driven by a drive means which is actuated when said calibrator moves.

4. In the calibrator of claim 3:
   said drive means comprising a ground engaging wheel mounted on an axle having an eccentric pin thereon, a drive rod rotatably mounted on said pin, said drive rod having a free end engaging teeth on said cam means whereby the reciprocal motion imparted to said drive rod by the turning of said wheel indexes said cam.

5. In the calibrator of claim 4:
   means for preventing movement of the cam means during the return stroke of the reciprocating drive rod.

6. In the calibrator of claim 3:
   a cocking lever rod carrying said intake means, follower means on said cocking lever rod engaging said cam means with the position of said cocking lever rod and, consequently, said intake means relative to the calibrated receiver being controlled by the cam means.

7. In the calibrator of claim 6:
   said cam means having first, second and third cam faces said follower means engaging each of said cam faces during succeeding periods of a calibration run.

8. In the calibrator of claim 7:
   said cam having a circular end face with an outer land and an inner land, an outer surface of said outer land, an outer surface of said inner land, and an inner surface of said inner land defining said first, second and third cam faces respectively.

9. In the calibrator of claim 8:
   said outer and inner lands being defined by a first radial slot, a semi-annular slot, a second radial slot and a centrally located circular slot, said first radial slot extending from the outer surface of said outer land to the inner surface of said outer land, said second slot extending from the outer surface of said inner land to the inner surface of said inner land.

10. In the calibrator of claim 7:
said calibrator frame having first and second discharge manifolds and said calibrated receiver having a receiving tube mounted thereon, said intake coupling being aligned with said first discharge manifold when the follower means engages the first cam face, said coupling being aligned with said receiving tube when said follower means engages said second cam face and said intake coupling being aligned with said second discharge manifold when said follower means engages said third cam face.

11. A calibrator for calibrating chemical sprayer apparatus and the like comprising:
a frame;
an intake means adapted to be connected to a fluid supply line of the equipment being calibrated, said intake means being mounted on a cocking lever rod which is carried by said frame;
first and second spaced-apart discharge manifolds carried by said frame for directing flow of fluid from the intake means onto the ground;
a calibrated receiver for measuring the fluid output of said supply line, said calibrated receiver carried by said frame and having a receiver tube intermediate said first and second discharge manifolds;
control means responsive to the distance traversed by said calibrator and engaged by said cocking lever rod for positioning said intake means with respect to said discharge manifolds and said receiver tube to regulate the period of discharge from said intake means into said receiver whereby the fluid discharge from said supply line for a specific distance can be measured.

12. In the calibrator of claim 11, the cocking lever rod being slidably carried by said frame, said cocking lever rod being spring-loaded and said cocking lever rod having a follower means thereon for engaging the control means.

13. In the calibrator of claim 11, said control means comprising a cam means having first, second and third cam faces, the cocking lever rod having a follower means for engaging said cam faces whereby when said follower means engages said first cam face the intake means is aligned with the first discharge manifold, when the follower engages the second cam face the intake means is aligned with the receiver tube of the calibrated receiver and when the follower is in contact with said third cam face the intake means is aligned with said second discharge manifold.

14. In the calibrator of claim 13:
said cam having a circular end face with an outer land and an inner land, an outer surface of said outer land, an outer surface of said inner land, and an inner surface of said inner land defining said first, second and third cam faces respectively.

15. In the calibrator of claim 14:
said outer and inner lands being defined by a first radial slot, a semi-annular slot, a second radial slot and a centrally located circular slot, said first radial slot extending from the outer surface of said outer land to the inner surface of said outer land, said second slot extending from the outer surface of said inner land to the inner surface of said inner land.

References Cited

UNITED STATES PATENTS

| 1,967,847 | 7/1934 | Wachendorff | 73—3 |
| 2,852,166 | 9/1958 | Gandrud | 222—311 |

LOUIS R. PRINCE, *Primary Examiner.*

HARRY C. POST III, *Assistant Examiner.*

U.S. Cl. X.R.
239—65